United States Patent [19]

Saito et al.

[11] Patent Number: 5,019,966
[45] Date of Patent: May 28, 1991

[54] DUAL PROCESSORS USING BUSY SIGNAL FOR CONTROLLING TRANSFER FOR PREDETERMINED LENGTH DATA WHEN RECEIVING PROCESSOR IS PROCESSING PREVIOUSLY RECEIVED DATA

[75] Inventors: Sayuri Saito; Kazutoshi Yoshizawa; Yoshitaka Kitada, all of Tokyo, Japan

[73] Assignee: NEC Corporation, Tokyo, Japan

[21] Appl. No.: 91,813

[22] Filed: Sep. 1, 1987

[30] Foreign Application Priority Data

Sep. 1, 1986 [JP] Japan .................. 61-206406
Sep. 1, 1986 [JP] Japan .................. 61-206408

[51] Int. Cl.$^5$ ................. G06F 13/42; G06F 15/16
[52] U.S. Cl. ................. 364/200; 364/238.7; 364/260.1; 364/242.1
[58] Field of Search ... 364/200 MS File, 900 MS File; 375/36, 106, 107; 340/825.14, 825.20

[56] References Cited

U.S. PATENT DOCUMENTS

| | | | |
|---|---|---|---|
| 4,071,887 | 1/1978 | Daly et al. | 364/200 |
| 4,208,714 | 6/1980 | Eklund et al. | 364/200 |
| 4,247,908 | 1/1981 | Lockhart, Jr. et al. | 364/200 |
| 4,358,825 | 11/1982 | Kyu et al. | 364/200 |
| 4,390,944 | 6/1983 | Quackenbush et al. | 364/200 |
| 4,390,947 | 6/1983 | DeShon | 364/200 |
| 4,514,825 | 4/1985 | Nordling | 375/9 |
| 4,570,220 | 2/1986 | Tetrick et al. | 364/200 |
| 4,642,791 | 2/1987 | Mallozzi et al. | 364/900 |
| 4,663,730 | 5/1987 | Ikeda | 364/900 |
| 4,756,006 | 7/1988 | Rickard | 375/7 |
| 4,785,415 | 11/1988 | Karlquist | 364/900 |

Primary Examiner—Thomas C. Lee
Attorney, Agent, or Firm—Foley & Lardner

[57] ABSTRACT

A transmitting data processor comprises a data processing unit for supplying a predetermined length of data to be transferred and generating a transfer start signal, and a data transferring unit receiving the predetermined length of data to be transferred from the data processing unit and for transferring the predetermined length of data in a serial form to a receiving data processor. The transmitting data processor also includes a busy detector for detecting a busy signal from the receiving data processor, a register for temporarily holding the transfer start signal from the data processing unit, and a start controller associated to the data transferring unit for causing the data transferring unit to stop the transfer of data during the period the busy signal is active and for allowing the data transferring unit to start the transfer of data when the busy signal becomes inactive after the transfer start signal is generated.

The receiving data processor includes a data receiving unit for receiving the predetermined length of data transferred from the transmitting data processor, and a data processing unit coupled to the receiving unit for processing the received data and generating a transfer acknowledge signal when it has completed the processing of the received data. The receiving data processor also includes a busy signal generator for generating the above mentioned busy signal in response to completion of reception of the predetermined length of data and making the busy signal inactive when the transfer acknowledge signal is generated.

17 Claims, 10 Drawing Sheets

DUAL PROCESSORS USING BUSY SIGNAL FOR CONTROLLING TRANSFER FOR PREDETERMINED LENGTH DATA WHEN RECEIVING PROCESSOR IS PROCESSING PREVIOUSLY RECEIVED DATA

BACKGROUND OF THE INVENTION

1. Field of the Invention

The present invention relates to a data processor, and in particular, to a serial data processor having a clock line and a data line, which executes the transmission/reception of data in synchronism with a serial clock.

2. Description of Related Art

As a way for transferring data between a plurality of semiconductor processors (called "LSI" hereinafter) there are provided a means a method using a data bus of 8 bits or more, parallel lines and a serial transfer method transferring the data in series bit by bit. Since the latter method requires a fewer number of signal lines for connecting the LSIs to one another, it is largely used as a simple data transfer means between LSIs.

In serial data transfer, one unit of data (for example, of 8 bits) is transferred continuously in the form of serial bits, but an interval period is required between transfers of each unit of data to confirm the reception. If the receiver is not capable of receiving data, it is necessary to wait until the receiver becomes capable. Conventionally, in the case of a receiver which is capable, a BUSY signal is supplied to the transmitter. The transmitter checks the BUSY signal and discriminates whether or not the data can be transferred so as to generated a transfer start signal when it becomes possible to transfer. This start signal is needed in order to control a serial clock necessary for serial data transfer or to clear a counter counting the bit number of data to be transferred.

However, the conventional serial data processor has been so designated that after checking whether or not the processor which is to be a receiver is in a busy condition, a start signal for the next data transfer is not generated until the busy condition is dissolved. Thus, in case the busy condition extends for a long time, the useless waiting time for checking the busy condition is increased, lowering the efficiency of the whole data processing operation. Specifically, in the serial data processor the simplest way to check the busy condition by is interrupt processing. However, in a data processor which does not perform the function of multi-interrupt control, if another interrupt is generated during the checking time, the processing of the second interrupt must be waited delayed until it is returned to the main program after dissolution of the busy condition. Thus, there has been a problem in that it takes an extremely long time to respond to the interrupt. Further, it is necessary to prepare a program for maintaining the data processor in a waiting condition until the busy condition is dissolved, thereby limiting the program area for the proper processing of data.

On the other hand, a serial data processor which is used as a receiver, after having received serial data, outputs a BUSY signal so as to inform another serial data processor which is used as a transmitter that the receiving device is in the course of processing data processing. Therefore, it has been required to execute special programs for setting and dissolving the BUSY signal. Such programs are mostly started by interrupt processing. Since it must take a long time to execute interrupt processing for the BUSY control, a long period is required until the data processor returns to the proper main program processing after reception of the serial data. Further, as it is necessary to prepare the programs for setting and dissolving the BUSY condition, there has been a problem in that the program area for proper data processing is limited by the programs for controlling the BUSY signal. Particularly, in case a large amount of data is transferred in series, one round of processing consisting of a 1-bite serial data transfer and data processing needs a long time. Thus, there also is the drawback that the transfer speed is lowered.

SUMMARY OF THE INVENTION

Accordingly, it is an object of the present invention to provide a data processor having a data transfer function, which has overcome at least one of the above mentioned drawbacks of the conventional processors.

Another object of the present invention is to provide a data processor which can execute a serial data transfer at a high speed.

Still another object of the present invention is to provide a data processor which can be used as a transmitter and which can wait for the dissolution of the busy condition of a receiving device while allowing processing of an interrupt generated in the busy condition.

A further object of the present invention is to provide a data processor which can be used as a receiver and which can generate a busy signal without requiring a special program, so that the data processor can process an interrupt generated in the busy condition.

In order to achieve the above and other objects of the present invention, there is provided in accordance with one aspect of the present invention a data processor comprising a data processing means for supplying a predetermined length of data to be transferred and generating a transfer start signal, a data transferring means receiving the predetermined length of data to be transferred from the data processing means for transferring the same data through a data transferring terminal, means for detecting a transfer inhibit signal from an external source, means receiving the transfer start signal from the data processing means for temporarily holding the same transfer start signal, and transfer control means associated with the data transferring means for causing the data transferring means to stop the transfer of data during the period the transfer inhibiting signal is active and allowing the data transferring unit to start the transfer of data at least when the transfer inhibiting signal becomes inactive after the transfer start signal is generated.

Preferably, the data transferring means includes a shift register having a parallel input coupled through an internal data bus to the data processing means to receive a predetermined length of parallel data from the data processing means, the shift register having a serial output coupled to the data transfer terminal, and a clock control means for generating a serial clock to a clock transferring terminal and to the shift register so as to cause the data held in the shift register to be outputted from the serial output of the shift register in synchronism with the serial clock.

Further, the transfer inhibit signal detecting means includes a busy detector responsive to a busy signal from a data receiving device for generating a busy detection signal, and the transfer start signal holding means includes a flip-flop adapted to be set by the transfer start signal so as to generate a start memory signal. In addition, the transfer control means includes a transfer start controller receiving the busy detection signal and the start memory signal for generating, when the busy detection signal is inactive and the start memory signal is active, a start trigger signal for the clock control means and the flip-flop, so that the clock control means causes the shift register to output the serial data and the flip-flop is reset.

In one embodiment, the busy detector is connected at its input to a busy signal terminal independent of the data transfer terminal.

In another embodiment, the busy detector is connected at its input to the data transfer terminal, and the serial output of the shift register is connected to an input of an buffer circuit whose output is connected to the data transfer terminal. The output of the buffer circuit assumes either a high impedance condition or a low level condition in response to the input so that when the data transfer terminal is connected to a pulled-up data transfer line, the data transfer line is selectively brought either into a low level condition or into a high level in accordance with the output condition of the buffer circuit.

In accordance with another aspect of the present invention there is provided a data processor comprising a data receiving means for receiving a predetermined length of data through a data transfer terminal and generating a reception end signal when the predetermined length of data has been received, a data processing means coupled to the data receiving means for processing the received data and generating a transfer acknowledge signal when the processing of the received data has been completed, and means receiving the reception end signal and the transfer acknowledge signal for generating a transfer inhibit signal after the reception end signal has been generated until the transfer acknowledge signal has been generated.

Preferably, the data receiving means includes a shift register having a serial input coupled to the data transfer terminal and a parallel output coupled through an internal data bus to the data processing means, and a clock control means receiving a serial clock through a clock transferring terminal for causing the transfer data to be serially inputted to the shift register in synchronism with the received clock.

Furthermore, the transfer inhibit signal generating means includes a flip-flop having a set input connected to receive the reception end signal and a reset input connected to receive the transfer acknowledge signal. The flip-flop also has an inverted output generating a busy signal which is rendered active when the reception end signal becomes active and is rendered inactive when the transfer acknowledge signal becomes active.

In one embodiment, the inverted output of the flip-flop is connected to a busy signal terminal independent of the data transfer terminal.

In another embodiment, the clock control means is adapted to generate a synchronizing clock after the predetermined length of data has been received, and the processor further includes a synchronizing flip-flop receiving the inverted output of the busy signal generating flip-flop and the synchronizing clock for generating a synchronous busy signal starting from a first synchronizing clock after the inverted output of the busy signal generating flip-flop is rendered active, and a buffer circuit having an input connected to receive the synchronous busy signal and an output connected to the data transfer terminal. The output of the buffer circuit assumes a high impedance condition when the synchronous busy signal is inactive and a low level condition when the synchronous busy signal is active, so that when the data transfer terminal is connected to a pulled-up data transfer line, the data transfer line is selectively brought either into a low level or into a high level in accordance with the output condition of the buffer circuit.

The above and other objects, features and advantages of the present invention will be apparent from the following description of preferred embodiments of the invention with reference to the accompanying drawings.

DESCRIPTION OF PREFERRED EMBODIMENTS

Figure 1:
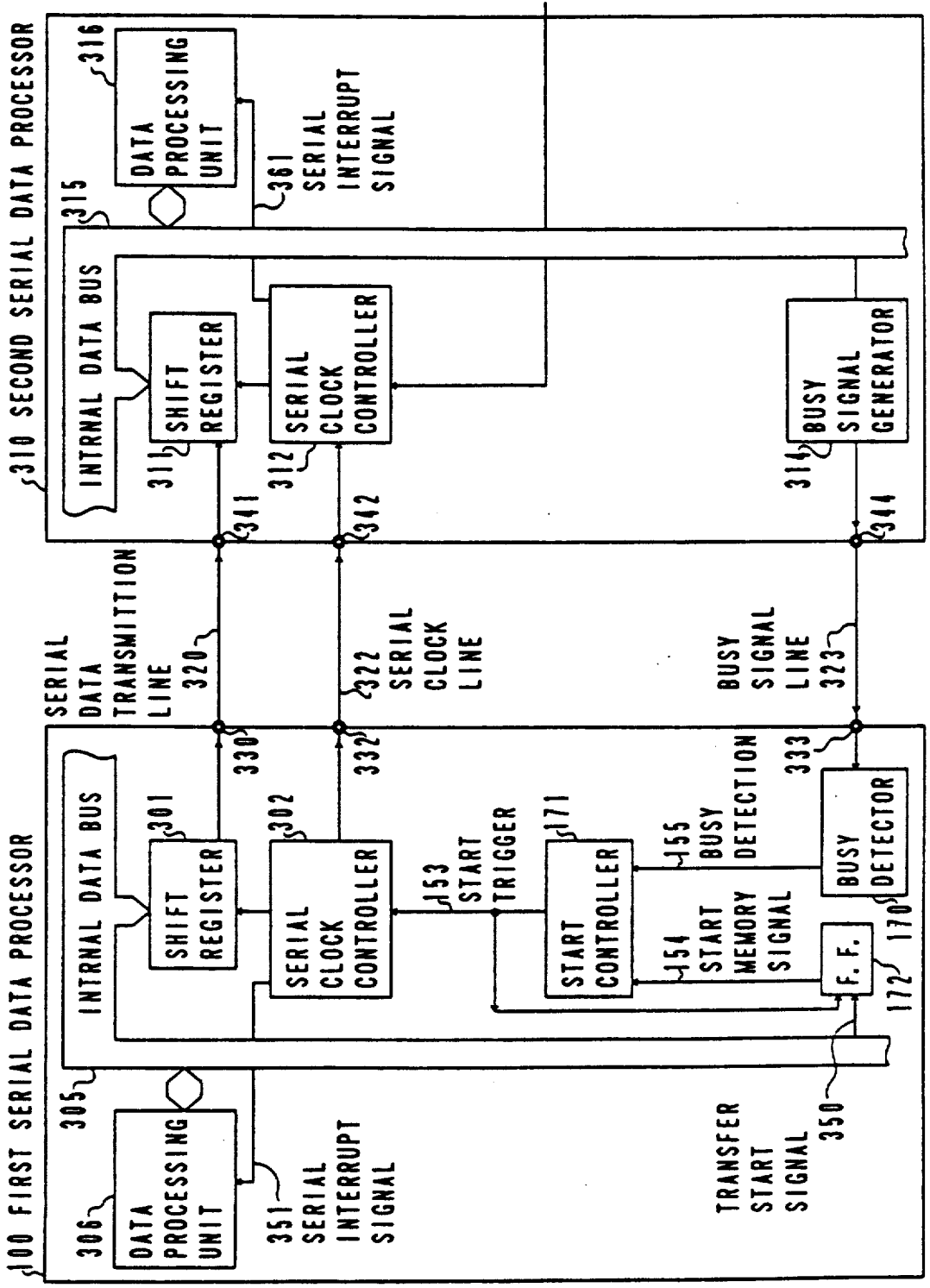
FIG. 1 is a block diagram of a serial data processor of a first embodiment in accordance with the present invention.

FIG. 1 is a block diagram of a data transfer system including a serial data processor of a first embodiment in accordance with the present invention, which includes a first serial data processor 100 which is used as a transmitter and a second serial data processor 310 which is used as a receiver.

First, an explanation will be provide for the first serial data processor 100 which is used as the transmitter. The first serial data processor 100 comprises a shift register 301, a serial clock controller 302, a busy detector 170, a start controller 171, a start memory flip-flop 172, an internal data bus 305, a data processing unit 306, a serial data output terminal 330, a serial clock terminal 332 and a BUSY input terminal 333, which are coupled as shown. Since the shift register 301, the serial data output terminal 330, the serial clock terminal 332, the BUSY input terminal 333, the internal data bus 305 and the data processing unit 306 may be identical with conventional devices, a, detailed description thereof, is unnecessary.

The start memory flip-flop 172 is used to store the fact that the start instruction has been dispatched. The flip-flop 172 is set by a transfer start signal 350 generated by the data processing unit 306 at the time of execution of a transfer start instruction so as to output a high level start memory signal 154. The BUSY detector 170 receives a BUSY signal from the BUSY input terminal 333 and detects the condition of the busy signal. If the input signal is at a low level, i.e., in a busy condition, a high level signal is outputted as a BUSY detection signal 155. On the other hand, if the input signal is at a high level, i.e., not in the busy condition, a low level signal is outputted. The start controller 171 operates to inhibit the start of the serial transfer at the time of the busy condition. The start controller 171 receives the BUSY detection signal 155 and the start memory signal 154. When the BUSY detection signal 155 is at a low level and the start memory signal 154 is at a high level, the start controller 171 outputs a one shot pulse as a start trigger signal 153 to the clock controller 302. On the other hand, if the BUSY detection signal 155 is at a low level, the start controller 171 outputs the start trigger signal 153 just after the start memory signal 154 has become a high level.

When the BUSY detector 170 detects the condition of the BUSY signal inputted from the BUSY input terminal 333 and outputs a high level signal as the BUSY detection signal 155, even if a high level signal is outputted as the start memory signal 154, the one shot start trigger signal 153 will be not outputted to the serial clock controller 302. Thus, the serial clock controller 302 does not generate a serial clock. Namely, the start of the serial data transfer is reserved. When the start memory signal 154 is at a high level and then, the BUSY detector 170 outputs a low level signal 153 after detecting the dissolution of the busy condition, the start controller 171 outputs the start trigger signal 153 so as to dissolve the start reservation. When the start trigger signal 153 is outputted, the start memory flip-flop 172 is cleared by the same signal so that the start memory signal 154 goes to a low level.

The serial clock controller 302, after receiving the start trigger signal 153, outputs the serial clock to the serial clock terminal 332 and the shift register 301. Then, the shift register 301 initiates the shift operation.

The second serial data processor 310 which is used as a receiver may be of the same construction as that of the first serial data processor except that the second one has a BUSY signal generator 314. Therefore, circuits, lines, signals and terminals similar to corresponding ones of the first data processor 100 are given the Reference Numerals which are obtained by adding 10 to the Reference Numerals given to the corresponding ones of the first data processor 100. Explanation on the concerning similar stages of the second data processor 310 will be omitted.

Figure 2:
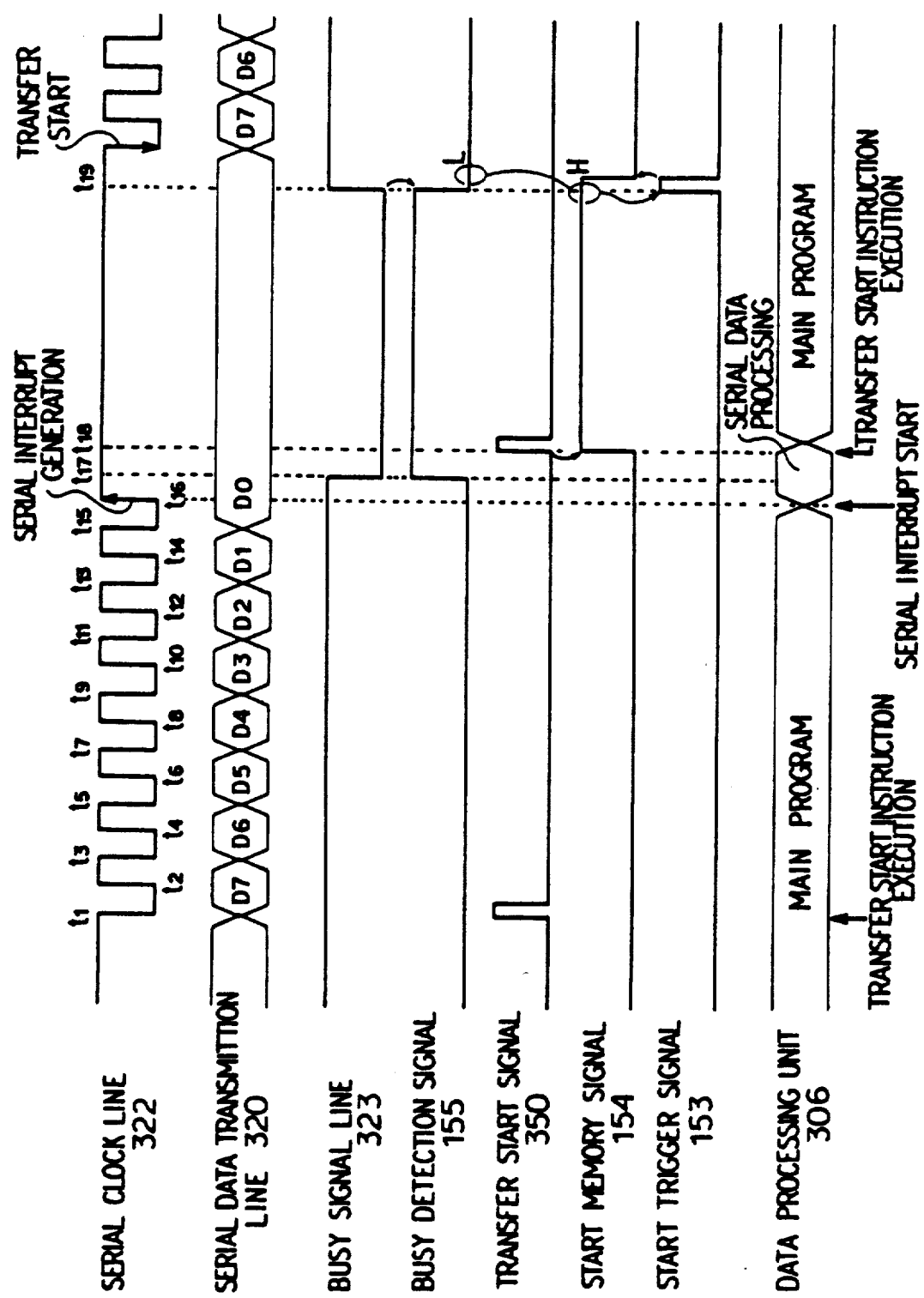
FIG. 2 is a timing chart of serial data transmitted/received by the serial data processor of the first embodiment.

Next, a description will be provided for operation in the case that 8-bit data is transferred from the first serial data processor 100 to the second serial data processor 310. The processor 100 is coupled to the processor 310 through a serial data line 320, a serial clock line 321 and a BUSY signal line 323. FIG. 2 is a timing chart illustrating the synchronous relation between serial data on the serial data line 320, a serial clock on the serial clock line 322, and a BUSY signal on the BUSY signal line 323. A transfer operation of 8-bit data from the first serial data processor 100 to the second serial data processor 310 is carried out by serially transmitting each bit of the data to be transferred in synchronism with the clock falling edge at $t_1$, $t_3$, $t_5$ ... $t_{15}$ and receiving them in serial in synchronism with the clock rising edge at $t_2$, $t_4$ ... $t_{16}$.

The second serial data processor 310, after having received 8-bit serial data, generates a serial interrupt at a time $t_{16}$. Then, the data processing unit 316 reads out the content of the shift register 311 through the internal data bus 315 so as to execute the required data processing. The BUSY signal generator 314 outputs, by an interrupt processing operation, a low level signal on the BUSY signal line 323 at a time $t_{17}$ so as to inform the first serial data processor 100 of the busy condition.

The first serial data processor 100 which is used as the transmitter detects the busy condition by means of the BUSY detector 170. The BUSY detector 170 detects the condition of the BUSY signal inputted from the BUSY input terminal 333 at the time $t_{17}$. If it is in a busy condition, the BUSY detector 170 changes the BUSY detection signal 155 to a high level. The data processing unit 306, having completed the processing for the next serial data (for example, setting the data to be next transferred to the shift register) in an interrupt mode, dispatches the transfer start instruction at a time $t_{18}$ in the same interrupt mode in order to carry out the next serial data transfer, and then outputs the transfer start signal 350. This operation is executed independently of the BUSY detection. Thereafter, the data processing unit 306 returns from the serial interrupt program to the main program, so as to execute its proper data processing. The start memory flip-flop 172 is set by the transfer start signal 350, so that the start memory signal 154 is changed to a high level.

The start controller 171 detects the transfer start instruction when the start memory signal 154 at a high level is inputted. But, during a period until $t_{19}$, the start trigger signal 153 is not outputted because the high level of the BUSY detection signal 155 is not outputted. Namely, while the second serial data processor 310 is outputting the BUSY signal, the start trigger signal 153 is not providing an output and therefore, the serial clock controller 302 cannot generate the serial clock. Thus, in this condition, the initiation of the serial transfer operation is reserved.

When the second serial data processor 310 which is used as the receiver completes data processing and dissolves the busy condition so that the BUSY signal line 323 is changed to a high level from a low level, the BUSY detection signal 155 is changed to a low level. When this BUSY detection signal 155 is changed to a low level, and if the start memory signal 154 is at a high level i.e., this satisfies two conditions of for the non-busy condition of the second serial data processor 310 and the start instruction execution, the one-shot start trigger signal 153 is outputted. After the start controller 171 outputs the start trigger signal 153, the serial clock controller 302 generates the serial clock. Then, there is initiated the shift operation of the shift register 301 wherein 8-bit data to be next transferred is set, so that 8-bit data is transmitted 1-bit by 1-bit to the processor 310. The start memory flip-flop 172 is cleared by the output of the start trigger signal 153. As a result, the start memory signal 154 is changed to a low level.

As seen from the above, in this embodiment, the start memory flip-flop stores the fact that there has been a transfer start instruction for the serial data. Therefore, the data processing unit can immediately return to the main program from the serial interrupt program without waiting while the BUSY signal is being outputted, so as to execute proper data processing.

Figure 3:
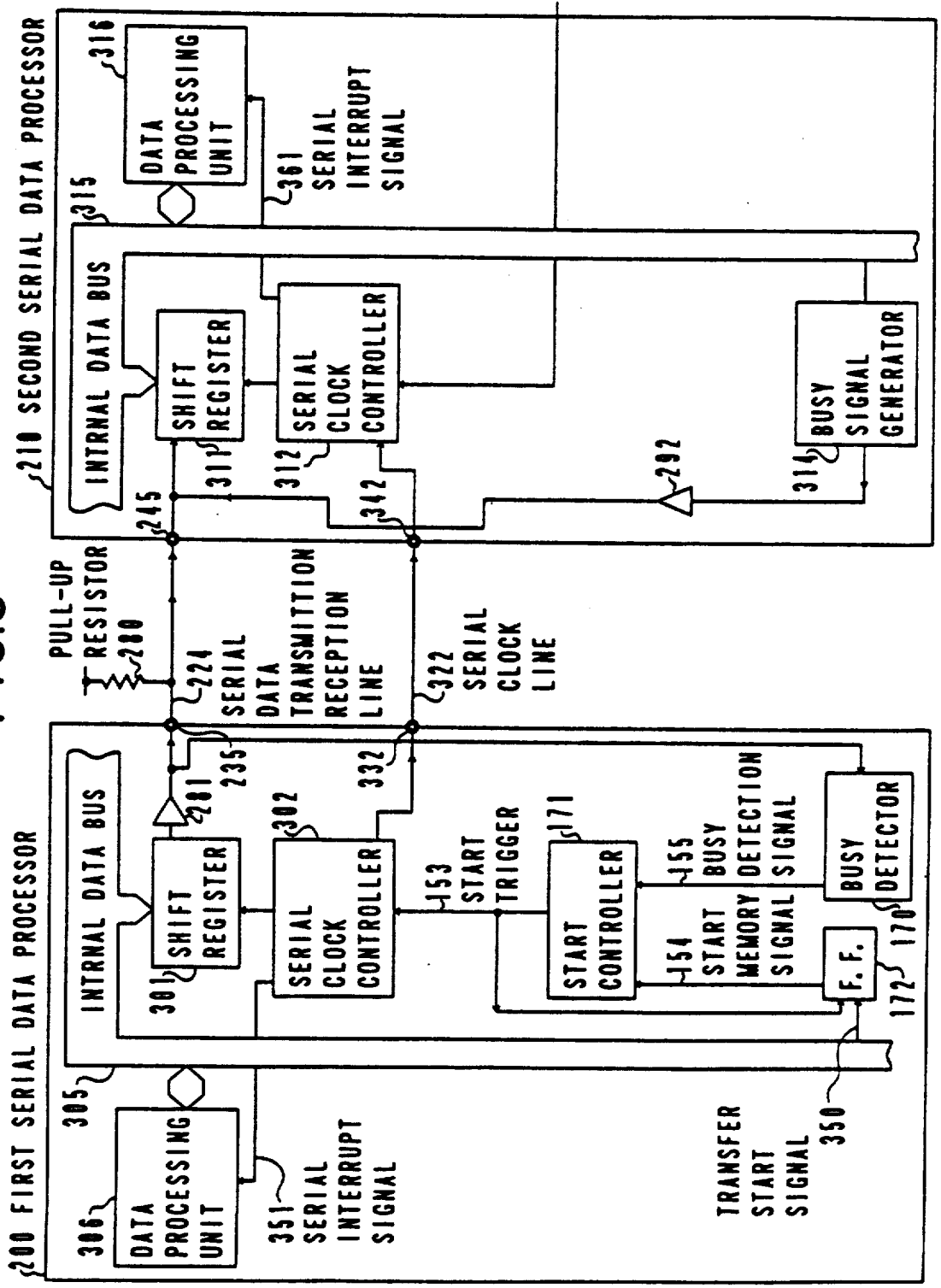
FIG. 3 is a block diagram showing a serial data processor of a second embodiment in accordance with the present invention.

FIG. 3 is a block diagram showing a second embodiment of a serial data processor including a first serial data processor 200 which is used as a transmitter and a second serial data processor 210 which is used as a receiver. In this embodiment, the BUSY signal line is omitted and the BUSY signal is transferred by using the serial data transfer line. Thus, the first and second data processors are connected each other by means of only two signal lines (data line and clock line). This embodiment is different from the first embodiment in construction in that the busy condition of the receiver is transmitted to the transmitter through the serial data input/output terminals. Therefore, circuits, lines, signals and terminals, similar to those shown in FIG. 1 are given the same Reference Numerals.

First, an explanation will be provided concerning the first serial data processor 200. The first serial data processor 200 comprises a shift register 301, a serial clock controller 302, a BUSY detector 170, a start controller 171, a start memory flip-flop 172, an internal data bus 305, a data processing unit 306, a shift register output buffer 281, a serial data input/output terminal 235 and a serial clock terminal 332, which are coupled as shown. Among them, the shift register 301, the start controller 171, the start memory flip-flop 172, the internal data bus 305, the data processing unit 306 and the serial clock terminal are identical with those of the first embodiment shown in FIG. 1, and so, a detailed description will be omitted.

The shift register 301 outputs serial data through the shift register output buffer 281 to the serial data input/output terminal 235. The shift register output buffer 281 operates to maintain its output at a high impedance when the output of the shift register 301 is "1", and to output a low level signal when the output of the shift register 301 is "0". The serial data transmission/reception line 224 is pulled up to a certain supply voltage by a pull-up resistor 280. If the shift register 301 outputs "1", the output of the shift register output buffer 281 becomes a high impedance, but, the serial data transmission/reception line 224 is changed to a high level by the pull-up resister 280. The output of the shift register 301 is controlled so as to maintain a high level after completion of the 8-bit serial data transfer. The BUSY detector 170 detects the BUSY signal on the serial data transmission/reception line 224 through the serial data input/output terminal 235.

Next, an explanation will be provided concerning the second serial data processor 210 which is used as a receiver. The second serial data processor 210 comprises a shift register 311, a serial clock controller 312, a BUSY output circuit 314, an internal data bus 315, a data processing unit 316, a BUSY output buffer 292, a serial data input/output terminal 245 and a serial clock terminal 342. Here, the shift register 311, the serial clock controller 312, the BUSY output circuit 314, the internal data bus 315, the data processing unit 316 and the serial clock terminal 342 are identical with those shown in FIG. 1, and so, a detailed explanation will be omitted. However, in this embodiment, the output of the BUSY output circuit 314 is transmitted, through the BUSY output buffer 292 and the serial data input/output terminal 245, and also through the serial data transmission/reception line 224 to the first serial data processor 200. The BUSY output buffer 292 is adapted to bring its output to a high impedance when the output of the BUSY output circuit 314 is "1", and to output a low level signal when the output of the BUSY output circuit 314 is "0".

If the output of the first serial data processor 200 is "1", the shift register output buffer 281 has a high output impedance. On the other hand, the serial data transmission/reception line 224 is pulled up to a high level by the pull-up resistor 280. But, if the BUSY output circuit 314 of the second serial data processor 210 outputs a low level signal through the BUSY output buffer 292, the serial data transmission/reception line 224 is turned to a low level, so that the BUSY detector 170 of the shift serial data processor 200 detects a low level signal through the serial data input/output terminal 235.

Figure 4:
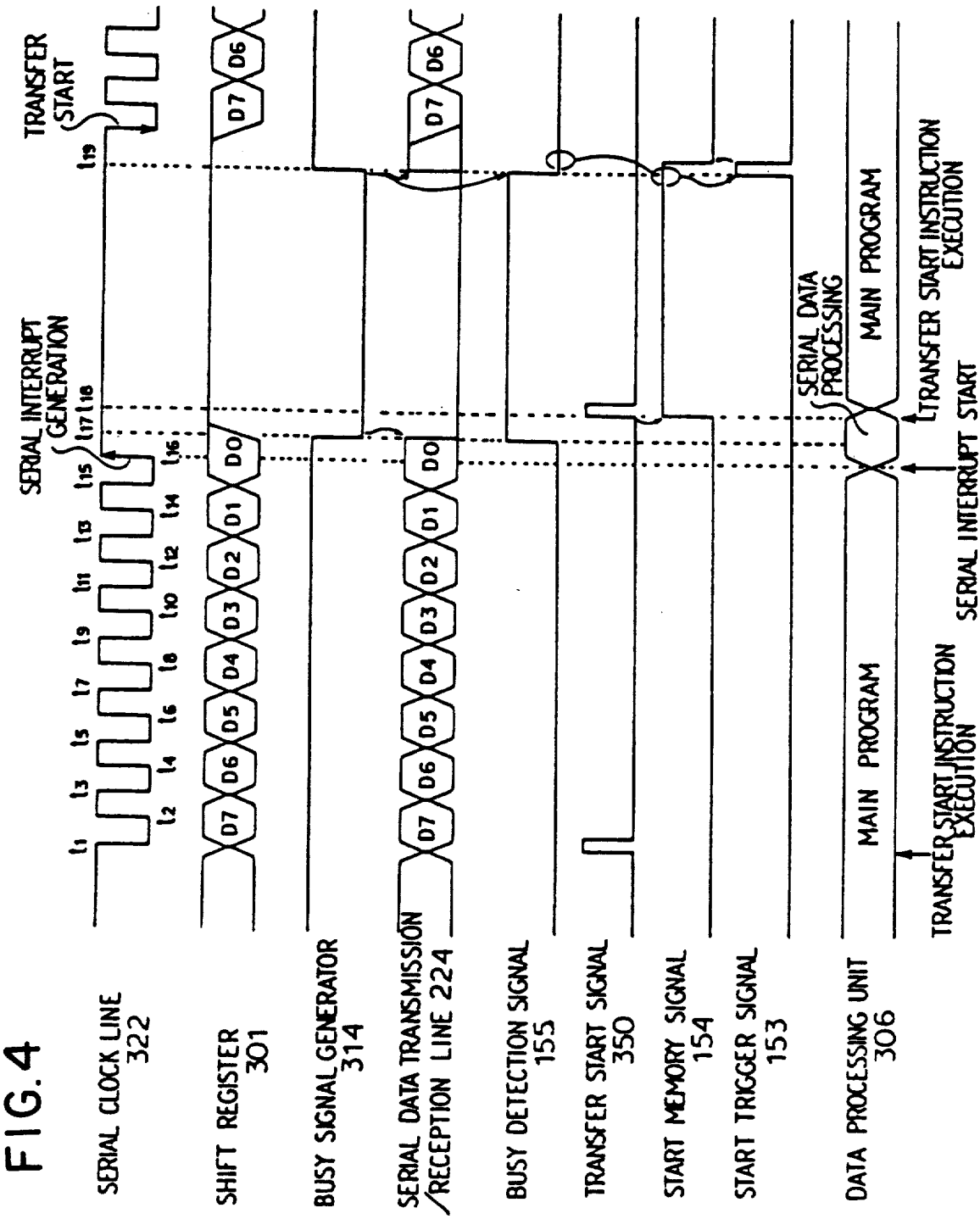
FIG. 4 is a timing chart of serial data transmitted/received by the serial data processor of the second embodiment.

Now, with reference to FIG. 4, there will be shown a synchronous relation in the case that 8-bit data is transferred from the first serial data processor 200 to the second serial data processor 210. FIG. 4 is a timing chart illustrating the synchronous relation between serial data on the serial data transmission/reception line 224, a serial clock on the serial clock line 322 and the BUSY signal on the serial data transmission/reception line 224. The 8-bit data shift operation from the first serial data processor 200 to the second serial data processor 210 is made in a similar manner to that in FIG. 1, and therefore, a detailed description will be omitted. But, the output of the shift register 301 is changed to a high level at a time $t_{17}$ after completion of the 8-bit serial data transfer, so as to prepare to receive the BUSY signal from the receiver.

The serial data processor 210, having received 8-bit serial data, generates a serial interrupt at a time $t_{16}$. Then, the data processing unit 316 reads out the content of the shift register 311 through the internal data bus 315 so as to execute required data processing.

The BUSY signal generator 314 outputs, by interrupt processing, a low level signal on the serial data transmission/reception line 224 through the BUSY output buffer 292 at a time $t_{17}$ so as to inform the first serial data processor 200 of the busy condition.

The first serial data processor 200 which is used as the transmitter detects the busy condition by means of the BUSY detector 170. Namely, the first serial data processor 200 detects the BUSY signal inputted from the BUSY input terminal 333 and changes the BUSY detection signal 155 to a high level.

The data processing unit 306, having completed the processing for the next serial data, writes the next data to be transferred on the shift register 311 at a time $t_{18}$. As a result, the transfer start signal 350 is generated regardless of the BUSY signal. Thereafter, the data processing unit 306 returns from the serial interrupt program to the main program so as to execute proper data processing.

The start memory flip-flop 172 is set by the transfer start signal 350 so that the start memory signal 154 is changed to a high level.

The start controller 171 detects that the transfer start instruction has been dispatched when the start controller 171 receives the start memory signal 154 at a high level. But, since the BUSY detection signal 155 is at a high level during a period to time $t_{19}$, the start controller 171 does not output the start trigger signal 153.

Namely, the start trigger signal 153 is not outputted while the second serial data processor 210 is outputting the BUSY signal. Thus, since the serial clock controller 302 does not generate a serial clock, the initiation of the serial transfer operation is reserved.

After completion of data processing by the second serial data processor 210 which is as a receiver, the busy condition is dissolved at a time $t_{19}$. Then, the serial data transmission/reception line 224 is changed from a low level to a high level, so that the BUSY detection signal 155 is changed to a low level. In this state, since the start memory signal 154 is at a high level, two conditions are satisfied, i.e., the non-busy condition of the second serial data processor and the start instruction execution. As a result, the start trigger signal 153 is outputted. When the start controller 171 outputs the start trigger signal 153, the serial clock controller 302 generates a serial clock to initiate the shift operation of the next 8-bit shift register 301. The start memory flip-flop 172 is cleared by the start trigger signal 153, so that the start memory signal 154 is changed to a low level.

As stated above, the same effect as that of the first embodiment can be attained by means of an apparatus which transfers the data and the BUSY signal through one signal line.

As seen from the above, the above mentioned serial data processors including the function of start signal reservation during the busy condition, can immediately return to the main program from the serial interrupt program without waiting while the receiver device is outputting the BUSY signal, so as to restart proper data processing. Thus, the data processing capacity is greatly increased.

Figure 5:
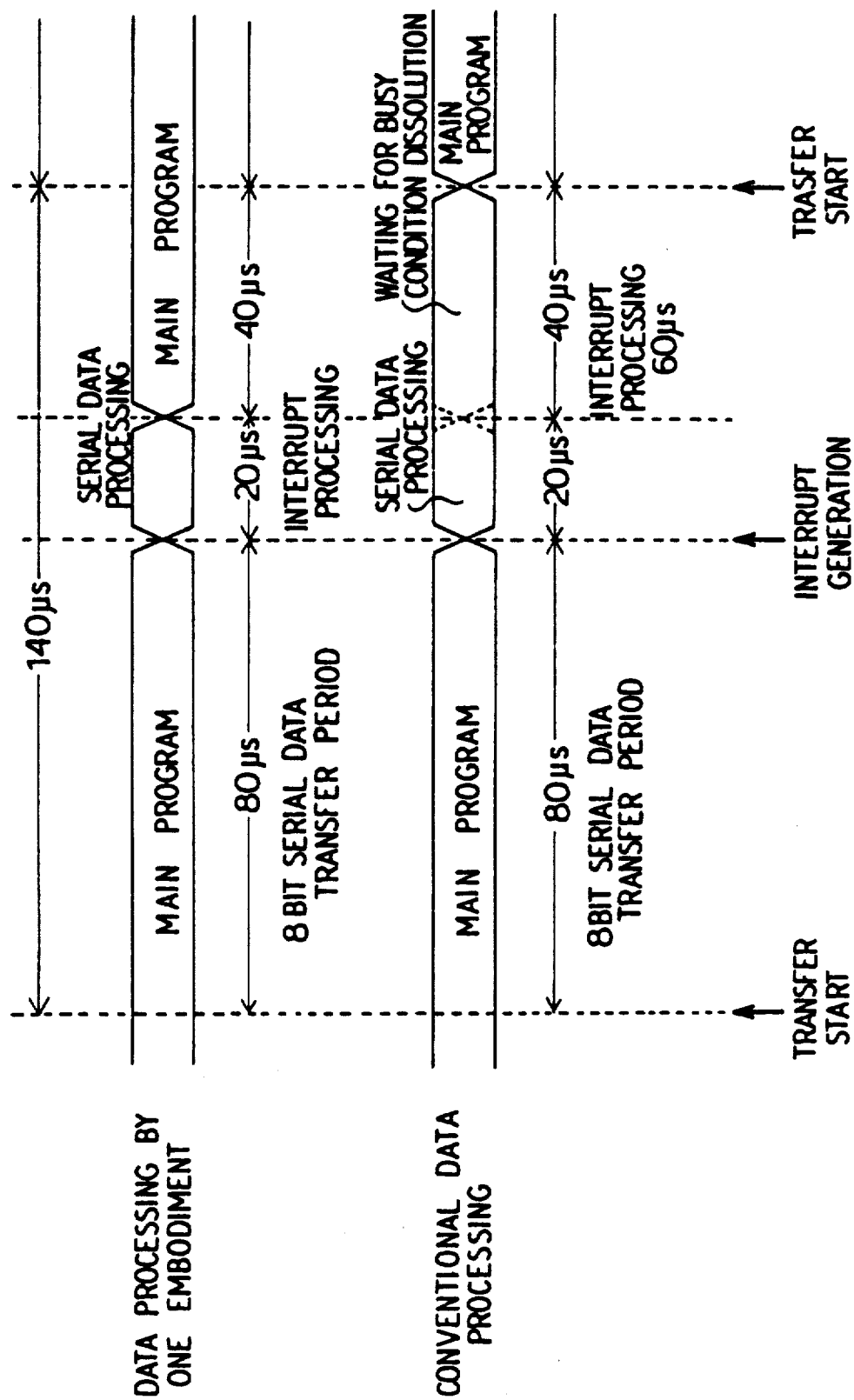
FIG. 5 is a timing chart showing the comparison of the respective data processing operations of the serial data processor according to the present invention and the conventional serial data processor.

For example, next there will be explained the case in which a plurality of bytes of 8-bit serial data are transferred with reference to FIG. 5. FIG. 5 is a timing chart showing each data processing operation of the above mentioned serial data processor and a conventional serial data processor.

In the embodiment according to the present invention, as it takes 10 microseconds to transfer data of 1-bit, it takes 80 microseconds to transfer 8-bit data. On the other hand, in the conventional serial data processor, it takes 60 microseconds for interrupt processing after the data tranfer and 140 microseconds in total. The interrupt processing of 60 microseconds consists of serial data processing of 20 microseconds and a waiting time of 40 microseconds for dissolution of the busy condition. In other words, conventionally, the main program execution time occupies 80 microseconds in the total of 140 microseconds, the data processing efficiency being 57%. On the other hand, with the serial data processor according to the present invention, after serial data processing, even during a period of 40 microseconds until initiation of the next serial data transfer, proper data processing can be executed. Therefore, the main program execution time occupies 120 microseconds in the total of 140 microseconds, the data processing efficiency being 86% which means 1.5 times as compared with the conventional one.

Further, after completion of the serial interrupt, the serial data processor according to the present invention can return from the serial interrupt program to the main program. Therefore, it is possible to execute processing of the other interrupt generated in the busy condition. Thus, particularly in a data processor not capable of multi-interrupt, the response time of the interrupt is remarkably reduced. Also, in case of the real time processing, a great effect can be obtained.

Moreover, it is not necessary to prepare a program for waiting until the busy condition of the receiver is dissolved, so that there can be stored in the remaining program area a program for data processing. Thus, it is possible to use effectively the limited memory.

As compared with the conventional serial data processor, the processor according to the present invention can be realized by adding much less hardware such as a BUSY signal detector, a start memory flip-flop and a start reservation circuit. Therefore, improvement can be obtained when the present invention is applied as a serial data processor. In addition, the present invention can be applied to busy processing in parallel data transfer.

Figure 6:
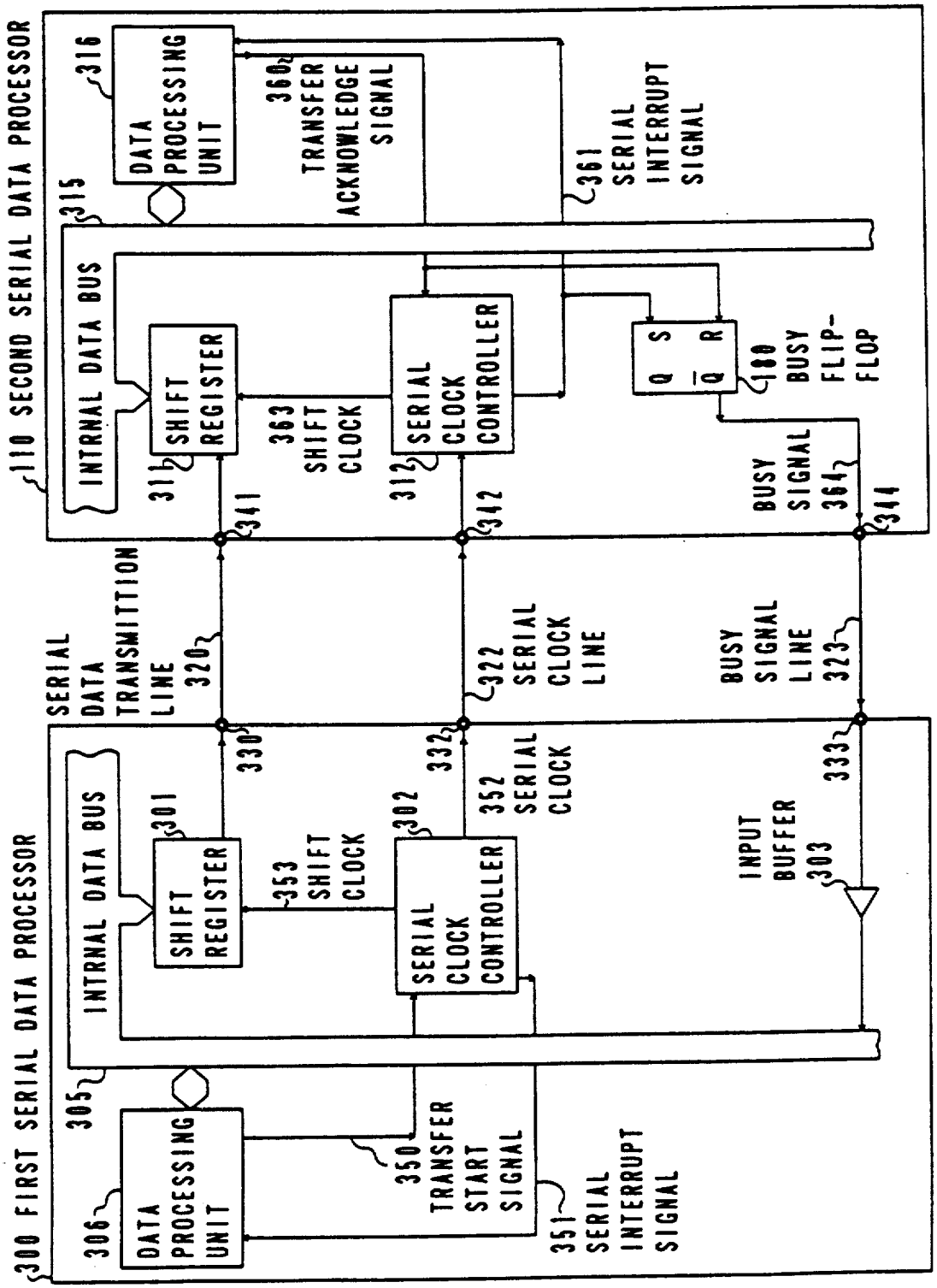
FIG. 6 is a block diagram showing a serial data processor of a third embodiment in accordance with the present invention.

FIG. 6 is a block diagram of a third embodiment of transmission/reception system composed of a pair of serial data processors, including a first serial data processing device 300 which is used as a master and a second serial data processing device 110 which is used as a slave.

The first serial data processing unit 300 which is used as a master comprises a shift register 301 for data transmission/reception, a serial clock transmitter 302, a BUSY signal input buffer 303 and a data processing unit 306, all being coupled to one another by means of an internal bus 305.

The shift register 301 is a register of 8-bit construction which executes a shift operation for data input/output in synchronism with the falling edge of a serial clock 352. The output of the shift register 301 is outputted through a serial data output terminal 330 to a serial data transmission line 320. The data processing unit 306 controls the processing operation of the whole serial data processing device 300. The data processing unit 306 executes writing of the transmission data into the shift register 301 and the reading operation of the input buffer 303, both through the internal data bus 305. Further, when the start instruction is executed, the data processing unit 306 outputs the transfer start signal 350. Moreover, the data processing unit 306 starts the interrupt by a serial interrupt signal 351 so as to execute interrupt processing. When the transfer start signal 350 is inputted, the serial clock controller 302 generates the above mentioned serial clock 352 which is outputted to a serial clock terminal 332 and also a shift clock 353 is outputted to the shift register 301. When eight serial clocks 352 are outputted, the supply of the serial clock 352 is stopped so as to stop the serial transfer, and the serial interrupt signal 351 is generated. At the time of no transfer, a high level signal is outputted to a serial clock line 322. A BUSY input terminal 333 is connected to a BUSY signal line 323. The input buffer 303 is adapted to output the condition of the BUSY input terminal 333 to the internal data bus 305, which is turned on when the data processing unit 306 executes a BUSY signal read instruction.

Next, a description will be provided concerning the second serial data processing device 110 which is a slave. The second serial data processing device 110 comprises a shift register 311, a serial clock controller 312, a BUSY flip-flop 180, an internal data bus 315, a data processing unit 316, serial data input terminal 341, a serial clock terminal 342 and a BUSY output terminal 344. Among these, the shift register 311, the internal data bus 315, the data processing unit 316, the serial data input terminal 341, the serial clock terminal 342 and the BUSY output terminal 344 may be identical with those of the device 300 which is a master, and so, a detailed description will be omitted.

The BUSY flip-flop 180 operates to receive a serial interrupt signal 361 at a set input terminal and a transfer acknowledge signal 360 at a reset input terminal, respectively, and outputs a BUSY signal 364 at its inverted output Q. When the rising edge of the serial interrupt signal 361 is inputted, the BUSY flip-flop 180 is set to output a low level signal to the BUSY output terminal 344. On the other hand, when the rising edge of the transfer acknowledge signal 360 is inputted, the BUSY flip-flop 180 is cleared to output a high level signal to the BUSY output terminal 344.

Figure 7:
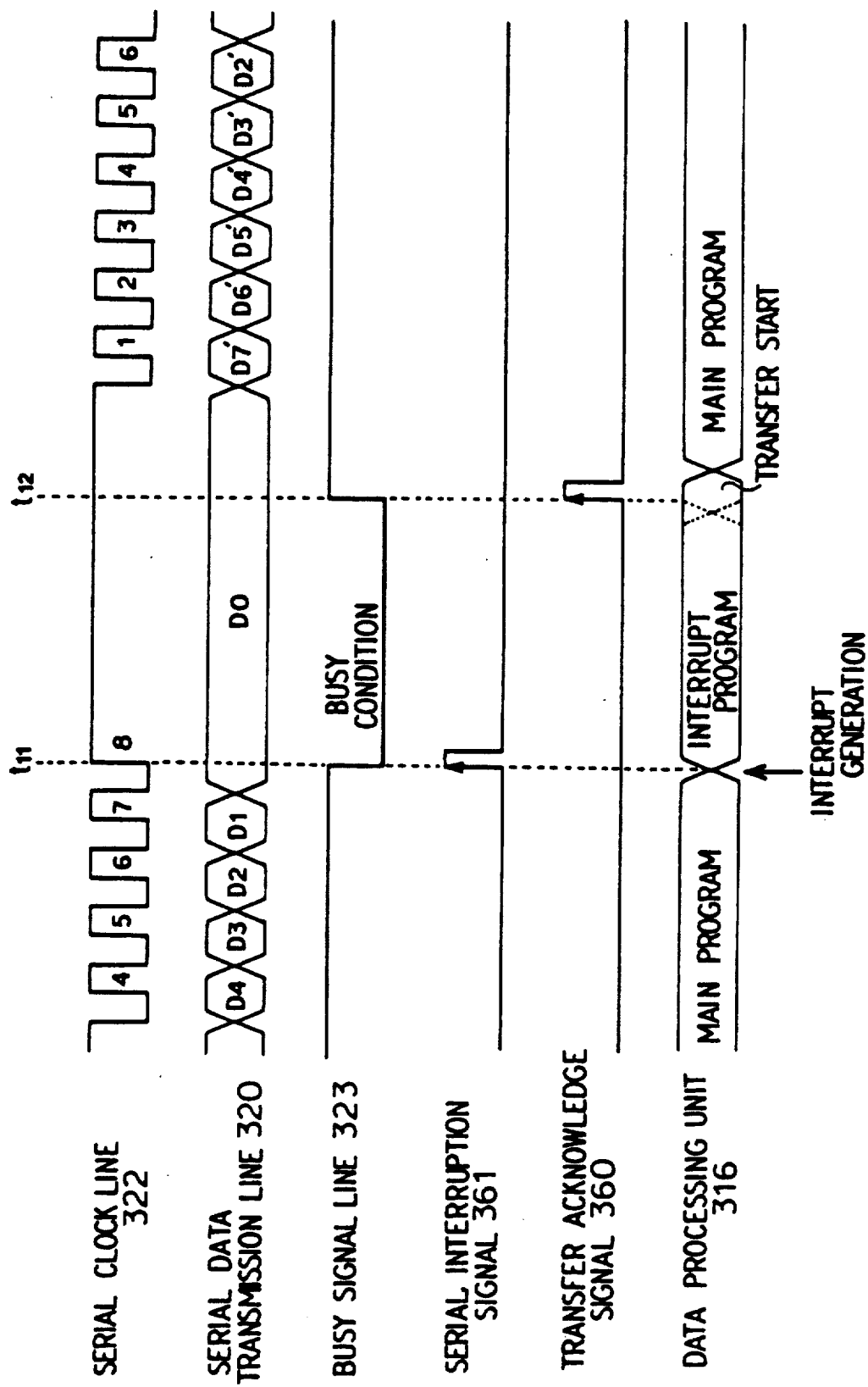
FIG. 7 is a timing chart of serial data transmitted/received by the serial data processor of the third embodiment.

Next, with reference to a timing chart in FIG. 7, there will be shown a synchronous relation in the case in which 8-bit data is transferred from the first serial data processing device 300 and to the second serial data processing device 110. FIG. 7 is a timing chart showing a synchronous relation between serial data on the serial data line 320, a serial clock on the serial clock line 322 and a BUSY signal on the BUSY signal line 323. Here, from the first serial data processing device 300, the data is transmitted 1-bit by 1-bit in synchronism with the clock. Then, the data is received in synchronism with the rising of the clock by the second serial data processing device 110.

The second serial data processing device 110, having received the 8-bit serial data, generates the serial interrupt signal 361 at a time $t_{11}$. The BUSY flip-flop 180, being set at the time $t_{11}$, outputs a low level signal on the BUSY signal line 323, so as to inform the first serial data processing device 300 of the busy condition.

A data processing unit 316 reads out the content of the shift register 311 by interrupt processing and carries out the necessary data processing, so as to execute the transfer start or acknowledge instruction for receiving the next serial data at a time $t_{12}$. The BUSY flip-flop 180, being cleared at the time $t_{12}$, outputs a high level signal on the BUSY signal line 323 so as to inform the first serial data processing device 300 that the busy condition is dissolved.

The first serial data processing unit 300, which carries out at any time the sampling of the BUSY signal line 323, confirms the dissolution of the busy condition of the second serial data processing device 110, so as to initiate the next serial data transfer.

As stated above, in this embodiment, the busy condition is automatically set after having received the 8-bit serial data transfer, and the busy condition is dissolved by designation of the transfer start or acknowledge for the next serial data reception. Thus, it is not necessary at all to prepare a special program for the BUSY control.

Figure 8:
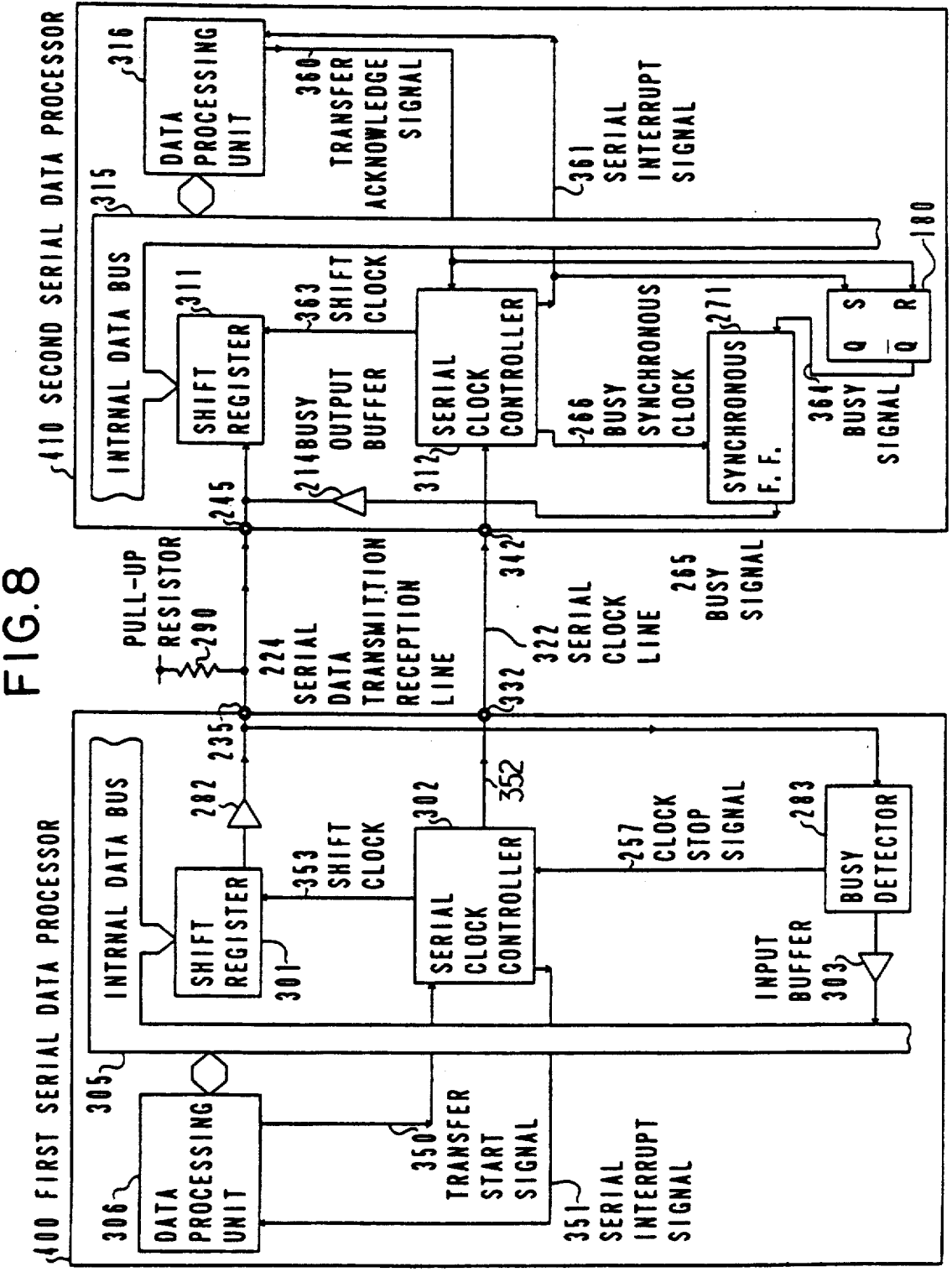
FIG. 8 is a block diagram showing a serial data processor of a fourth embodiment according to the present invention.

FIG. 8 is a block diagram of fourth embodiment of a serial data processor according to the present invention. In this figure, there are shown a first serial data processing device 400 which is used as a transmitter (master) and a second serial data processing device 410 which is used as a receiver (slave).

The fourth embodiment shows a serial data processor which can execute a BUSY signal transfer through a serial data line. This embodiment is different from the third one in construction in that the busy condition of the transmitter is transmitted to the receiver through the serial data input/output terminal.

First, a description will be provided concerning a first serial data processing device 400 which is used as a transmitter. The first serial data processing device 400 is composed of a shift register 301, a serial clock controller 202, an input buffer 303, a BUSY detector 283, an internal data bus 305, a data processing unit 306, a shift register output buffer 282, a serial data input/output terminal 235 and a serial clock terminal 332. Among these the shift register 301, the input buffer 303, the internal data bus 305, the data processing unit 306 and the serial clock terminal 332 may be identical with those of FIG. 6, and so, a detailed description will be omitted.

The shift register 301 outputs serial data through the shift register output buffer 282 to the serial data input/output terminal 235. The output of the shift register 301 is maintained at a high level after having transferred 8-bit serial data. The shift register output buffer 282 is of the open drain output type which operates to bring its output to a high impedance when the output of the shift register 301 is "1", and to output a low level signal when the output of the shift register 301 is "0". The serial data transmission/reception line 224 is pulled up to a certain supply voltage by means of a pull-up resistor 290. If the shift register 301 outputs "1", the output of the shift register output buffer 282 becomes a high impedance, but the serial data transmission/reception line 224 is changed to a high level by the pull-up resistor 290. The BUSY detector 283 detects the BUSY signal 364 on the serial data transmission/reception line 224 through the serial data input/output terminal 235. When the BUSY detector 283 detects a high level signal which indicates dissolution of the busy condition, the BUSY detector 283 outputs a clock stop signal 257. The serial clock controller 302 of FIG. 8 is different from the serial clock transmitter 302 shown in FIG. 6 in that the supply of the serial clock 352 to the serial clock terminal 332 continues even after generation of the serial interrupt signal 351, and the generation of the serial clock 352 is stopped by the clock stop signal 257.

Next, a description will be provided concerning the second serial data processing device 410 which is used as a receiver.

The second serial data processing unit 410 is composed of a shift register 311, a serial clock controller 312, a BUSY flip-flop 180, a synchronizing flip-flop 271, an internal data bus 315, a data processing unit 316, a BUSY output buffer 214, a serial data input/output terminal 245 and a serial clock terminal 342. Among these, the shift register 311, the internal data bus 315, the data processing device 316, the serial clock terminal 342 and the BUSY flip-flop 180 are identical with those of FIG. 6, a and so, detailed description will be omitted.

The serial clock controller 312 further functions to output a BUSY synchronizing clock 266. The BUSY synchronizing clock 266 is composed of a 9th clock and succeeding clocks of the serial clock 352. The synchronizing flip-flop 271 operates to receive a BUSY signal 364 and output a synchronous BUSY signal 265 in synchronism with the falling edge of the BUSY synchronizing clock 266. The BUSY output buffer 214 is of the open drain output type which operates to assume a high impedance output condition when the output of the synchronizing flip-flop 271 is "1", and to output a low level signal on the serial data transmission/reception line 224 when the output of the synchronizing flip-flop 271 is "0".

At the completion of the 8-bit serial data transfer, the condition of the serial data input/output terminal 235 of the first serial data processing device 200 becomes a high impedance, while the serial data transmission/reception line 224 is changed to a high level by a pull-up resistor 290. At this time, if the second serial data processing device 210 outputs a low level signal through the BUSY output buffer 214, the serial data transmission/reception line 224 is changed to a low level, which can be detected by the BUSY detector 283.

Figure 9:
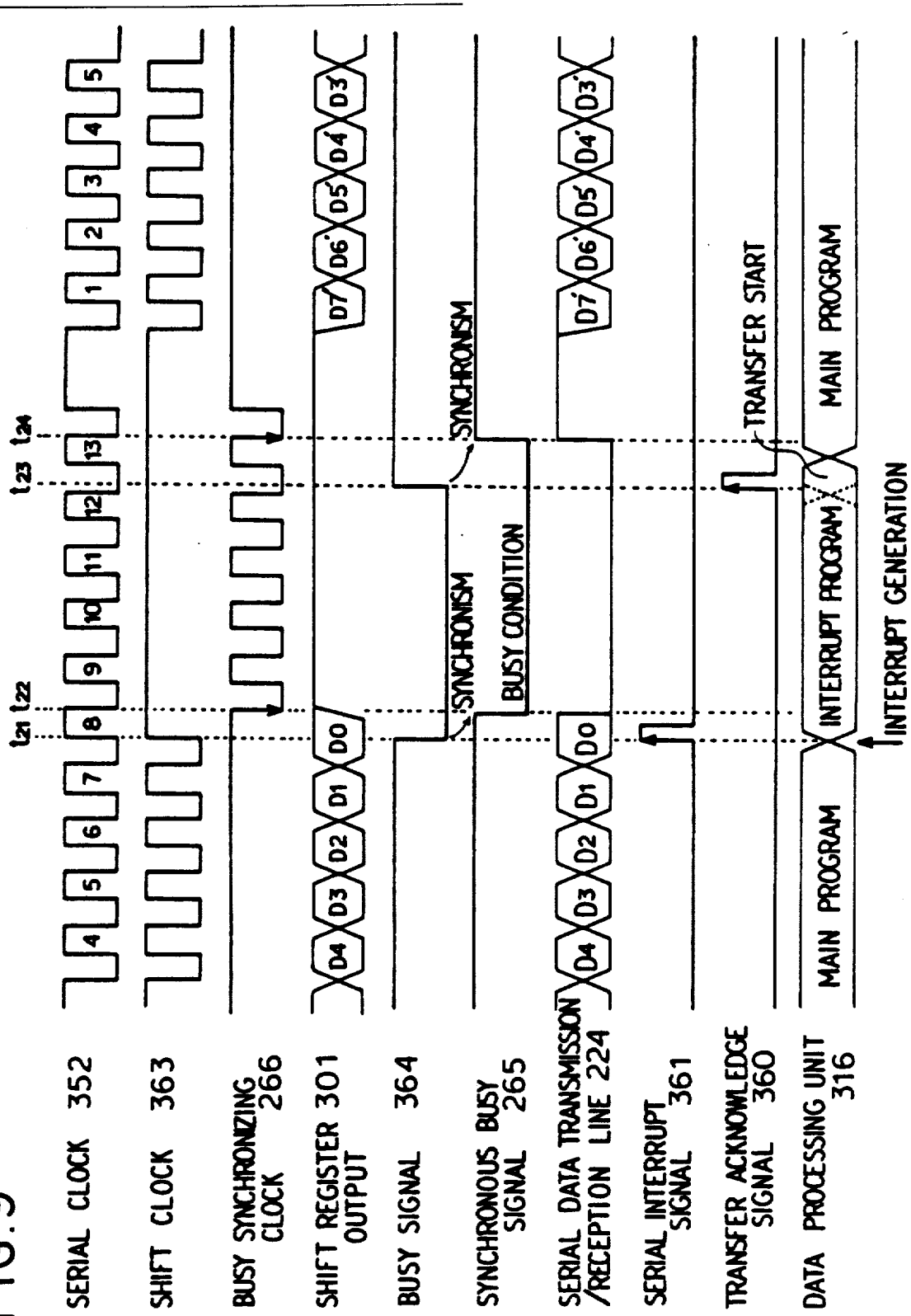
FIG. 9 is a timing chart of serial data transferred/received by the serial data processor of the fourth embodiment.

Next, with reference to the timing chart of FIG. 9, there will be shown a synchronous relation in the case in which 8-bit data is transferred from the first serial data processing device 400 to the second serial data processing device 410. FIG. 9 is a timing chart showing a synchronous relation between serial data and a BUSY signal on the serial data transmission/reception line 224 and a serial clock on the serial clock line 322. The 8-bit data transfer operation from the first serial data processing device 400 to the second serial data processing device 410 is made in the same way as that of FIG. 6, a and so, detailed description will be omitted. However, the output of the shift register 301 is changed to a high level at a time $t_{22}$ after completion of the 8-bit serial data transfer, so that a BUSY signal can be received from the receiver.

The second serial data processing device 410, having received 8-bit serial data, generates a serial interrupt signal 361 at a time $t_{21}$. The BUSY flip-flop 180 is set at a time $t_{21}$ so as to output a low level signal. The synchronizing flip-flop 271 outputs a low level signal to the serial data transmission/reception line 224 in synchronism with the falling time $t_{22}$ of the BUSY synchronizing clock 266 so as to inform the first serial data processing device 400 of the busy condition. The data processing device 316 reads out the content of the shift register 311 by interrupt processing, to carry out necessary data processing, and then generates the transfer start or transfer acknowledge signal at a time $t_{23}$ for receiving the next serial data. The BUSY flip-flop 180, being cleared at a time $t_{21}$, outputs a high level signal. The synchronizing flip-flop 271 outputs a high level signal to the serial data transmission line 224 in synchronism with the falling time $t_{24}$ of the BUSY synchronizing clock 266, so as to inform the first serial data processing device 400 that the busy condition is dissolved.

The first serial data processing device 400 carries out the sampling of the busy condition on the serial data transmission/reception line 224 by the BUSY detector 283 after the serial data is transferred, and initiates the next serial data transfer after having confirmed dissolution of the busy condition of the serial data processing device 210.

As seen from the above, in the case in which the transmission/reception of the serial data and the BUSY signal is carried out between serial data processing devices connected by means of a simple data line, such construction as shown in FIG. 8 makes it possible to automatically set the busy condition after completion of the 8-bit serial data transfer and to dissolve the busy condition with designation of the transfer start or acknowledge, without execution of special BUSY control programs.

As stated above, the above mentioned serial data processor includes a function capable of executing the setting of the busy condition automatically when the 8-bit serial data transfer is completed, and the dissolution of the busy condition by the serial transfer start operation. Therefore, after the serial transfer is started for the next serial data reception, it is possible to return immediately from the serial interrupt program to the main program so as to restart proper data processing, without executing the dissolution of the busy signal by means of a program. Thus, data processing capacity can be greatly improved.

Figure 10:
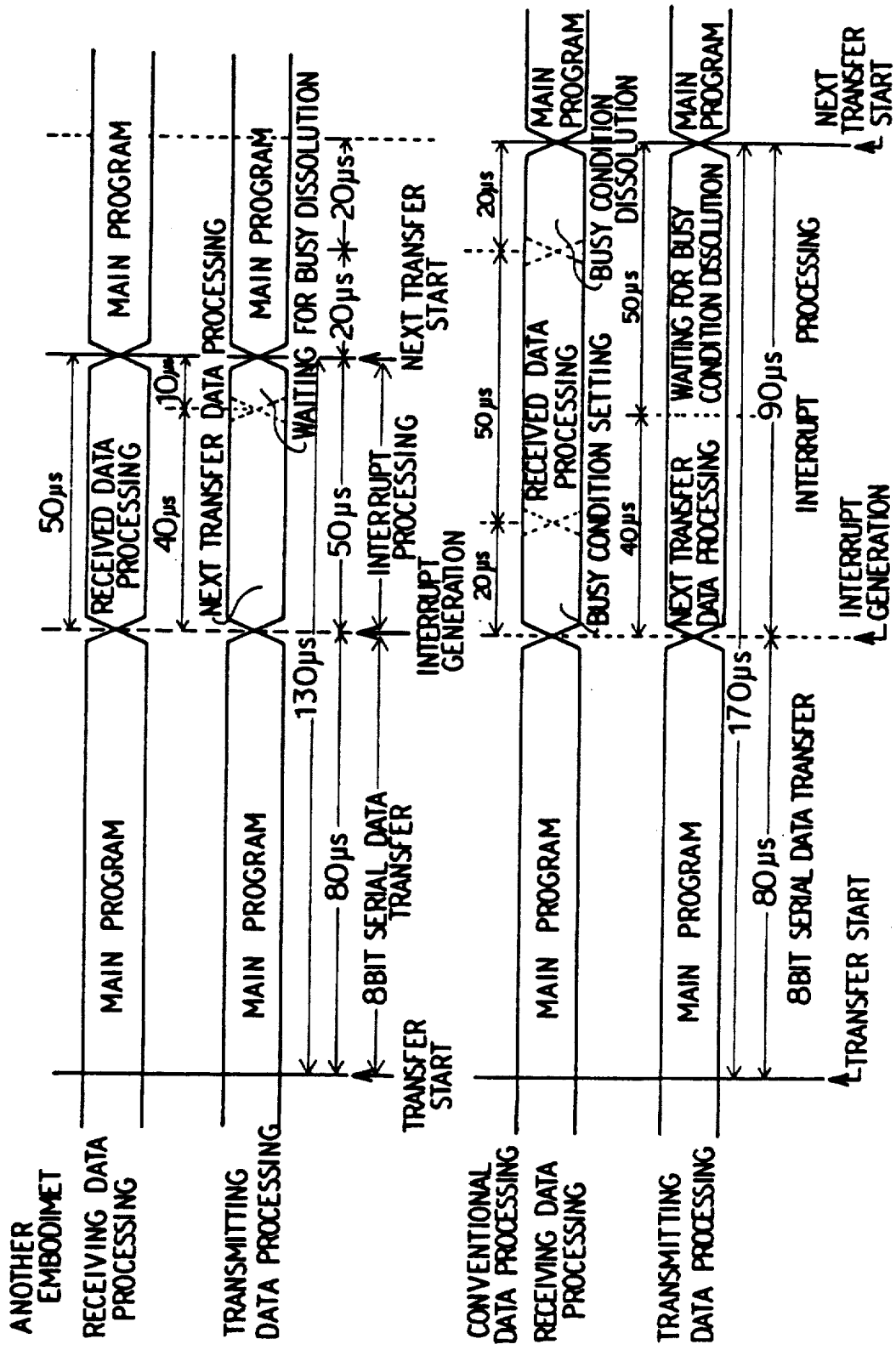
FIG. 10 is a timing chart illustrating the comparison of respective data processing operations by the serial data processor according to the present invention and the conventional serial data processor.

For example, one case in which a plurality of bytes are transferred in the form of 8-bit serial data will be explained with reference to FIG. 10. FIG. 10 is a timing chart illustrating respective data processing operations of the serial data processor according to the present invention and the conventional serial data processor.

In the conventional serial data processor, it takes 80 microseconds to execute the 8-bit serial data transfer. In the serial data processing device which is used as a receiver, the interrupt processing time after the transfer is 90 microseconds, resulting in 170 microseconds in total. The interrupt processing time 90 microseconds consists of the setting of the busy condition of 20 microseconds, the proper received data processing of 50 microseconds, and the dissolution of the busy condition of 20 microseconds. On the other hand, in the serial data processing device which is used as a transmitter, the interrupt processing after transfer is 90 microseconds which consists of the next transfer processing of 40 microseconds and the waiting time of 50 microseconds for dissolution of the busy condition.

In the serial data processor according to the present invention, it takes 80 microseconds as the conventional one to execute the 8-bit serial data transfer. However, in the serial data processing device which is used as a receiver, the interrupt processing time after transfer is 50 microseconds, resulting in 130 microseconds in total. The interrupt processing time 50 microseconds consists of 50 microseconds for executing the received data processing since the programs for setting and dissolving the busy condition are no longer necessary. Also, in the serial data processing device which is used as a transmitter, the interrupt processing after the transfer takes 50 microseconds consisting of the next transfer data processing of 40 microseconds and the waiting time of 10 microseconds for dissolution of the busy condition.

Now, an explanation will be provided concerning the detailed effects of the present invention.

At first, the interrupt processing time will be described. Conventionally, interrupt processing has taken 90 microseconds. According to the present invention, it takes only 50 microseconds which is for received data processing since a processing time 40 microseconds for setting and dissolving the busy condition can be cut off. Thus, the interrupt processing time can be reduced to almost one half as compared with that of the conventional data processor.

Secondly, the main program processing time will be described. The main program processing time has occupied conventionally 80 microseconds of the 8-bit serial data transfer in the total of 170 microseconds, resultant processing efficiency being 47%. On the other hand, according to the present invention, a processing time of 40 microseconds for setting and dissolving the busy condition is not necessary, so that during the period of 40 microseconds the main program can be executed. Therefore, the main program processing time results in 120 microseconds by adding the 40 microseconds to 80 microseconds for transferring 8-bit serial data. Thus, the obtained processing efficiency is increased to 67%, which means that 1.5 times the data processing can be carried out as compared with the conventional one.

Thirdly, the serial data transfer speed will be described. One round of the serial data processing time which consists of the 8-bit serial data transfer time and the interrupt processing time has been conventionally 170 microseconds. According to the present invention, it takes only 130 microseconds, resultant speed of one round serial data transfer being increased to 1.3 times as compared with the conventional one. Thus, particularly in the case that a large amount of serial data is transferred, improvement can be expected.

Fourthly, there will be described the timing on the return to the main program in the serial data processing device which is used as a transmitter. The serial data processing device which is used as a transmitter can return to the main program earlier by 40 microseconds, as a result of reduced time in the interrupt processing of the serial data processing device which is used as a receiver. Thus, in a data processor which does not have a multi-interrupt function, the response speed to the interrupt is remarkably improved. In particular, if it is applied to real time processing, improvement can be expected.

Fifthly, there will be described the efficiency in the use of the program area. In the serial data processing device which is used as a receiver, the programs for setting and dissolving the busy condition are no longer necessary, so that in the program area prepared for the above programs there can be stored the program for data processing. Thus, it is possible to use the limited memory more effectively.

Further, since the BUSY signal output circuit can be realized with an extremely small amount of hardware, there can be obtained such advantages as simplification of design and reduction of cost.

Furthermore, the present invention can be applied to the BUSY control for parallel processing.

The invention has thus been shown and described with reference to the specific embodiments. However, it should be noted that the invention is in no way limited to the details of the illustrated structures but changes and modifications may be made within the scope of the appended claims.

We claim:

1. A data sending data processor comprising:
    data processing means for supplying data of predetermined length to be transferred and for generating a transfer start signal for next data to be next transferred of said data of predetermined length after transfer of preceding data has been completed of said data of predetermined length;
    data transferring means receiving said data of predetermined length to be transferred from said data processing means for serially transferring, bit-by-bit, said data of predetermined length through a data transfer terminal to an external data receiving device so that said data of predetermined length is received by said external data receiving device in a bit-by-bit manner;
    means for detecting a transfer inhibit signal outputted from said external data receiving device during a period in which said preceding data received by said external data receiving device is processed in said external data receiving device;
    transfer start instruction flag means set by said transfer start signal from said data processing means for temporarily holding said transfer start signal; and
    transfer control means coupled to said data transferring means, to said transfer inhibit signal detection means and to said transfer start instruction flag means for controlling said data transferring means to stop transfer of said data of predetermined length during a period in which an effective transfer inhibiting signal is detected by said transfer inhibit signal detection means and to start transfer of said data of predetermined length after said transfer inhibiting signal becomes inactive when said transfer start instruction flag means is set by said transfer start signal and to reset said transfer start instruction flag means, whereby said data processing means can perform another processing operation during a period in which said data of predetermined length is being transferred and during another period in which said transfer inhibiting signal is effective.

2. A data processor claimed in claim 1 wherein said data transferring means includes:
    a shift register having a parallel input coupled through an internal data bus to said data processing means to receive a predetermined length of parallel data from said data processing means, said shift register having a serial output coupled to said data transfer terminal, and
    further including clock control means controlled by said transfer control means for supplying a serial clock to a clock transferring terminal and to said shift register so as to cause data held in said shift register to be outputted from said serial output of said shift register in synchronism with said serial clock.

3. A data processor claimed in claim 2 wherein:
    said transfer inhibit signal detecting means includes a busy detector responsive to a busy signal from a data receiving device for generating a busy detection signal;
    said transfer start instruction flag means includes a flip-flop set in response to said transfer start signal being active so as to generate a start request signal; and
    said transfer control means includes a transfer start controller receiving said busy detection signal and said start request signal for generating, when said busy detection signal is inactive and said start request signal is active, a start trigger signal to said clock control means and said flip-flop, so that said clock control means causes said shift register to serially output said data of predetermined length and said flip-flop is reset.

4. A data processor claimed in claim 3 wherein said busy detector is connected at its input to a busy signal terminal independent of said data transfer terminal.

5. A data processor claimed in claim 3 wherein said busy detector is connected at its input to said data transfer terminal, and wherein said serial output of said shift register is connected to an input of a buffer circuit whose output is connected to said data transfer terminal, said output of said buffer circuit assuming either a high impedance condition or a low voltage level in response to said input so that when said data transfer terminal is connected to a data transfer line pulled up to a high voltage through a register, said data transfer line is selectively brought either into a low voltage level or into a high voltage level in accordance with an output condition of said buffer circuit.

6. A data processor claimed in claim 1, wherein:
    said transfer inhibit signal detecting means includes a busy detector responsive to a busy signal from a data receiving device for generating a busy detection signal;

said transfer start instruction flag means includes a flip-flop set in response to said transfer start signal being active so as to generate a start signal; and said transfer control means includes a transfer start controller receiving said busy detection signal and said start signal for generating, when said busy detection signal is inactive and said start signal is active, a start trigger signal to said data transferring means and said flip-flop, so that said data transferring means starts to serially output said data and said flip-flop is reset.

7. A data processor claimed in claim 6 wherein said busy detector is connected at its input to a busy signal terminal independent of said data transfer terminal.

8. A data processor claimed in claim 6 wherein said busy detector is connected at its input to said data transfer terminal, and wherein a serial output of said data transferring means is connected to an input of a buffer circuit whose output is connected to said data transfer terminal, said output of said buffer circuit assuming either a high impedance condition or a low voltage level in response to said input so that when said data transfer terminal is connected to a data transfer line pulled up to a high voltage through a resister, said data transfer line is selectively brought either into a low voltage level or into a high voltage level in accordance with an output condition of said buffer circuit.

9. A data receiving data processor comprising:

data processing means for processing data received from an external data sending device and generating a transfer acknowledge signal when processing of said received data has been completed;

data receiving means responding to said transfer acknowledge signal for serially receiving, bit-by-bit, data of predetermined length through a data transfer terminal from said external data sending device and generating a reception end signal to said data processing means when said data of predetermined length has been received; and means connected to receive said reception end signal and said transfer acknowledge signal for generating a transfer inhibit signal to said external data sending device in response to said reception end signal and for inactivating said transfer inhibit signal when said transfer acknowledge signal has been generated, so that transfer of next data of predetermined length can be stopped in said external data sending device during a period in which said transfer inhibiting signal is effective.

10. A data processor claimed in claim 9 wherein said data receiving means includes:

a shift register having a serial input coupled to said data transfer terminal and a parallel output coupled through an internal data bus to said data processing means, and clock control means receiving a serial clock through a clock transferring terminal for supplying said serial clock to said shift register so that said data of predetermined length is serially inputted to said shift register in synchronism with said serial clock.

11. A data processor claimed in claim 10 wherein said transfer inhibit signal generating means includes a first flip-flop having a set input connected to receive said reception end signal and a reset input connected to receive said transfer acknowledge signal, said first flip-flop also having an inverted output generating a busy signal which is rendered active when said reception end signal becomes active and is rendered inactive when said acknowledge signal becomes active.

12. A data processor claimed in claim 11 wherein said inverted output of said first flip-flop is connected to a busy signal terminal independent of said data transfer terminal.

13. A data processor claimed in claim 11 wherein said clock control means generates a synchronizing clock after said data of predetermined length has been received, and further including a synchronizing flip-flop connected to receive said busy signal from said inverted output of said first flip-flop and said synchronizing clock for generating a synchronous busy signal starting from a first synchronizing clock after said inverted output of said first flip-flop is rendered active, and a buffer circuit having an input connected to receive said synchronous busy signal and an output connected to said data transfer terminal, said output of said buffer circuit assuming a high impedance condition when said synchronous busy signal is active so that when said data transfer terminal is connected to a data transfer line pulled up to a high voltage through a resistor, said data transfer line is selectively brought either into a low voltage level or into a high voltage level in accordance with an output condition of said buffer circuit.

14. A data processor claimed in claim 9 wherein said transfer inhibit signal generating means includes a flip-flop having a set input connected to receive said reception end signal and a reset input connected to receive said transfer acknowledge signal, said flip-flop also having an inverted output generating a busy signal which is rendered active when said reception end signal becomes active and is rendered inactive when said transfer acknowledge signal becomes active.

15. A data processor claimed in claim 11 wherein said inverted output of said first flip-flop is connected to a busy signal terminal independent of said data transfer terminal.

16. A data processor claimed in claim 11 wherein said data receiving means generates a synchronizing clock after said data of predetermined length has been received, and further including a synchronizing flip-flop connected to receive said inverted output of said first flip-flop and said synchronizing clock for generating a synchronous busy signal starting from a first synchronizing clock after said inverted output of said first flip-flop is rendered active, and a buffer circuit having a input connected to receive said synchronous busy signal and an output connected to said data transfer terminal, said output of said buffer circuit assuming a high impedance condition when said synchronous busy signal is inactive and a low voltage level when said synchronous busy signal is active so that when said data transfer terminal is connected to a data transfer line pulled up to a high voltage through a register, said data transfer line is selectively brought either into a low voltage level or into a high voltage in accordance with an output condition of said buffer circuit.

17. A data transfer system including:

a first data processor and a second data processor coupled through a data transfer line connected through a pull-up resistor to a voltage supply and through a clock line, said first processor comprising first data processing means for supplying data of predetermined length to be transferred and generating a transfer start signal for next data to be next transferred of said data of predetermined length after transfer of preceding data of said data of predetermined length has been completed;

data transferring means receiving said data of predetermined length to be transferred from said data processing means for serially transferring, bit-by-bit, said data of predetermined length through buffer means to a data transferring terminal connected to said data transfer line, said data transferring means supplying a synchronous clock to a clock transfer terminal connected to said clock line;

means connected to said data transferring terminal for detecting a transfer inhibit signal supplied from said second data processor during a period in which said preceding data received by said second data processor is processed in said second data processor;

flag means receiving said transfer start signal from said data processing means for temporarily holding said transfer start signal; and transfer control means associated with said data transferring means for controlling said data transferring means to stop transfer of said data of predetermined length during a period in which said transfer inhibiting signal is active and to start transfer of said data of predetermined length when said transfer inhibiting signal becomes inactive and said flag means is set by said transfer start signal and also to reset said flag means whereby said data processing means can perform another processing operation during a period in which said data of predetermined length is being transferred and during another period in which said transfer inhibiting signal is effective; and said second data processor comprising second data processing means for processing data received from said first data processor and generating a transfer acknowledge signal when processing of said received data has been completed, data receiving means connected to a data receiving terminal connected to said data transfer line for serially receiving said data of predetermined length through said data transfer line from said first data processor in response to said transfer acknowledge signal generated by said second data processing means, said data receiving means being also connected to a clock receiving terminal connected to said clock line, and a transfer inhibit signal generator for generating said transfer inhibit signal through a buffer circuit to said first data processor in response to completion of reception of said data of predetermined length and maintaining said transfer inhibit signal until said transfer acknowledge signal is generated, and making said transfer inhibit signal inactive when said transfer acknowledge signal is generated.

* * * * *